United States Patent
Blosch et al.

[11] Patent Number: 6,012,556
[45] Date of Patent: Jan. 11, 2000

[54] ELECTRIC MOTOR-DRIVEN BRAKING APPARATUS

[75] Inventors: Georg Blosch, Murr; Frieder Keller, Ubstadt-Weiher, both of Germany

[73] Assignee: Robert Bosch GmbH, Stuttgart, Germany

[21] Appl. No.: 08/998,763

[22] Filed: Dec. 29, 1997

[30] Foreign Application Priority Data

Dec. 30, 1996 [DE] Germany .......................... 196 54 729

[51] Int. Cl.$^7$ .................................................. F16D 55/02
[52] U.S. Cl. ........................ 188/71.8; 188/158; 188/162; 188/196 R
[58] Field of Search ................................. 188/71.1, 71.8, 188/72.1, 72.8, 158, 161, 162, 196 R, 198

[56] References Cited

U.S. PATENT DOCUMENTS

| | | | |
|---|---|---|---|
| 4,476,965 | 10/1984 | Brown, Jr. et al. ................... | 188/72.3 |
| 4,546,297 | 10/1985 | Washbourn et al. .................. | 188/162 |
| 4,953,668 | 9/1990 | Severinsson ........................... | 188/162 |
| 5,123,505 | 6/1992 | Antony .................................. | 188/72.8 |

FOREIGN PATENT DOCUMENTS

| | | |
|---|---|---|
| 0 246 770 A3 | 9/1988 | European Pat. Off. . |
| 42 29 042 A1 | 3/1993 | Germany . |

*Primary Examiner*—Robert J. Oberleitner
*Assistant Examiner*—Thomas J. Williams
*Attorney, Agent, or Firm*—Edwin E. Greigg; Ronald E. Greigg

[57] ABSTRACT

The invention relates to a braking apparatus having an electric service motor, which serves to actuate a brake via an actuating device. To enable adjusting an air clearance, the invention sets forth a helical gear and a load moment block, which blocks the helical gear against adjusting itself independently and allows adjustment by means of a readjusting motor. To adjust or establish the air clearance, the brake is actuated with the readjusting motor, until a brake lining contacts a brake body, such as a brake disk, and then moves backward by a defined distance. If the service motor and/or the actuating device fails, the braking apparatus can be released with the readjusting motor. In order to achieve a parking brake function, the invention sets forth a second load moment block for the actuating device.

3 Claims, 2 Drawing Sheets

ELECTRIC MOTOR-DRIVEN BRAKING APPARATUS

BACKGROUND OF THE INVENTION

The invention relates to a braking apparatus for a vehicle.

One such braking apparatus is known from German Patent Disclosure DE 42 29 042 A1, FIG. 3. It has an electric motor, which via a gear-wheel gear rotatingly drives a spindle of a spindle drive that converts the rotary drive motion into a linear motion to press a brake lining against a brake disk as the brake body. The known braking apparatus also has an emergency actuating device, with which the braking apparatus can be actuated if its electric motor fails. The known braking apparatus has the disadvantage of having no capability for readjusting an air clearance between the brake lining and brake disk with increasing brake lining wear. As a consequence, the actuation distance and thus also the time that elapses from the time braking is initiated until the brake engages become longer as brake lining wear increases. Another disadvantage of the known braking apparatus is that because of the design of its emergency actuating device, it cannot be released if its electric motor or the power supply thereof fails when the brake is actuated.

From European Patent Disclosure EP 0 246 770 A3, a brake actuating apparatus for a railroad brake is known. It has a first electric motor, which drives a first spindle drive, whose spindle is intended to press a brake shoe against a railroad wheel. The first electric motor with the first spindle drive is used to overcome the air clearance. The known brake actuating apparatus also has a second electric motor for driving a second spindle drive, whose spindle nut, with a long lever arm, engages a single-armed lever that is supported in a manner fixed to the frame. With the short lever arm, the lever engages the first spindle drive, so that the entire first spindle drive can be displaced with great force via the lever. This displacement motion is used to bring to bear a braking force. The known brake actuating apparatus has the disadvantage that it is not embodied for readjusting the air clearance. It has the further disadvantage that if its first electric motor fails, the air clearance can no longer be overcome, and hence no further braking action is attainable. Another disadvantage of the known brake actuating apparatus is that if its second electric motor fails, only minimal braking force can then be brought to bear with the first electric motor, and that it can be released with the first electric motor only if this first electric motor is adequately large.

OBJECT AND SUMMARY OF THE INVENTION

The braking apparatus according to the invention has a readjusting gear with an electric readjusting motor, with which an intended air clearance between the brake lining and the brake body can be established while the braking apparatus is released. In this way, an air clearance that is constant and is independent of brake lining wear, and thus a constant actuation distance of the braking apparatus, assured. The readjusting gear of the braking apparatus according to the invention also has a load moment block, which allows adjustment of the readjusting gear by means of the readjusting motor, and thus makes it possible to adjust or establish the air clearance, but which blocks the readjusting gear against adjusting itself independently, so that the readjusting gear cannot be adjusted by means of the forces acting on it during braking. This reliably prevents the readjusting gear from adjusting upon actuation of the braking apparatus, which would worsen the braking action or increase the air clearance. Since the readjusting motor adjusts the readjusting gear only when the braking apparatus is released, or in other words only when it has to overcome the intrinsic friction of the readjusting gear, and upon actuation of the braking apparatus is kept entirely free of the incident forces and moments by the load moment block, a readjusting motor of small size with low torque is sufficient.

Another advantage of the load moment block is that it is unblocked by actuation of the readjusting motor and blocks when the readjusting motor is at a stop; that is, it requires no energy supply of its own and no control signals for switching over from the blocking to the unblocked state and vice versa.

The load moment block, which blocks the readjusting gear against independent adjustment enables the use of a readjusting gear having a self-inhibition-free readjustment gear, for instance a helical gear, whose thread pitch is so great that self-inhibition does not occur. This has the advantage that the braking apparatus of the invention, if its actuating device fails during braking, can be released with the readjusting gear. This kind of failure of the actuating device, hereinafter called the fault mode, can be caused by a defect of the actuating motor or of its power supply, or by a mechanical defect of the actuating device that blocks the actuating device. For releasing in the fault mode, even if the braking apparatus is firmly tightened, the readjusting motor need merely bring to bear a slight unblocking moment to release the load moment block, since a reaction force to the contact-pressure force with which the brake lining is pressed against the brake body upon braking moves the self-inhibition-free readjusting gear in the release direction. Hence the readjusting motor need not bring to bear any moment for releasing the readjusting gear that is acted upon by the reaction force to the contact-pressure force of the brake lining against the brake body.

The use of a friction-locking load moment block, in particular a wrapped belt load moment block, which has an only slight unblocking moment that is independent of the moment impingement on the output side and that the readjusting motor must overcome, is advantageous.

In a refinement of the device, the actuating device also has a load moment block, which assures that the actuating device can be moved only by the service motor, and an automatic motion resulting from a contact-pressure force of the brake lining against the brake body is suppressed. This has the advantage that during braking with constant braking force, the service motor is fully relieved and need not be supplied with electric current. The service motor need merely be supplied with electric current in order to bring to bear a braking moment and to change the braking moment. Another advantage of this feature of the invention is that it can be used as a parking brake, because that brake maintains a braking moment, once brought to bear, even after the power supply is interrupted.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
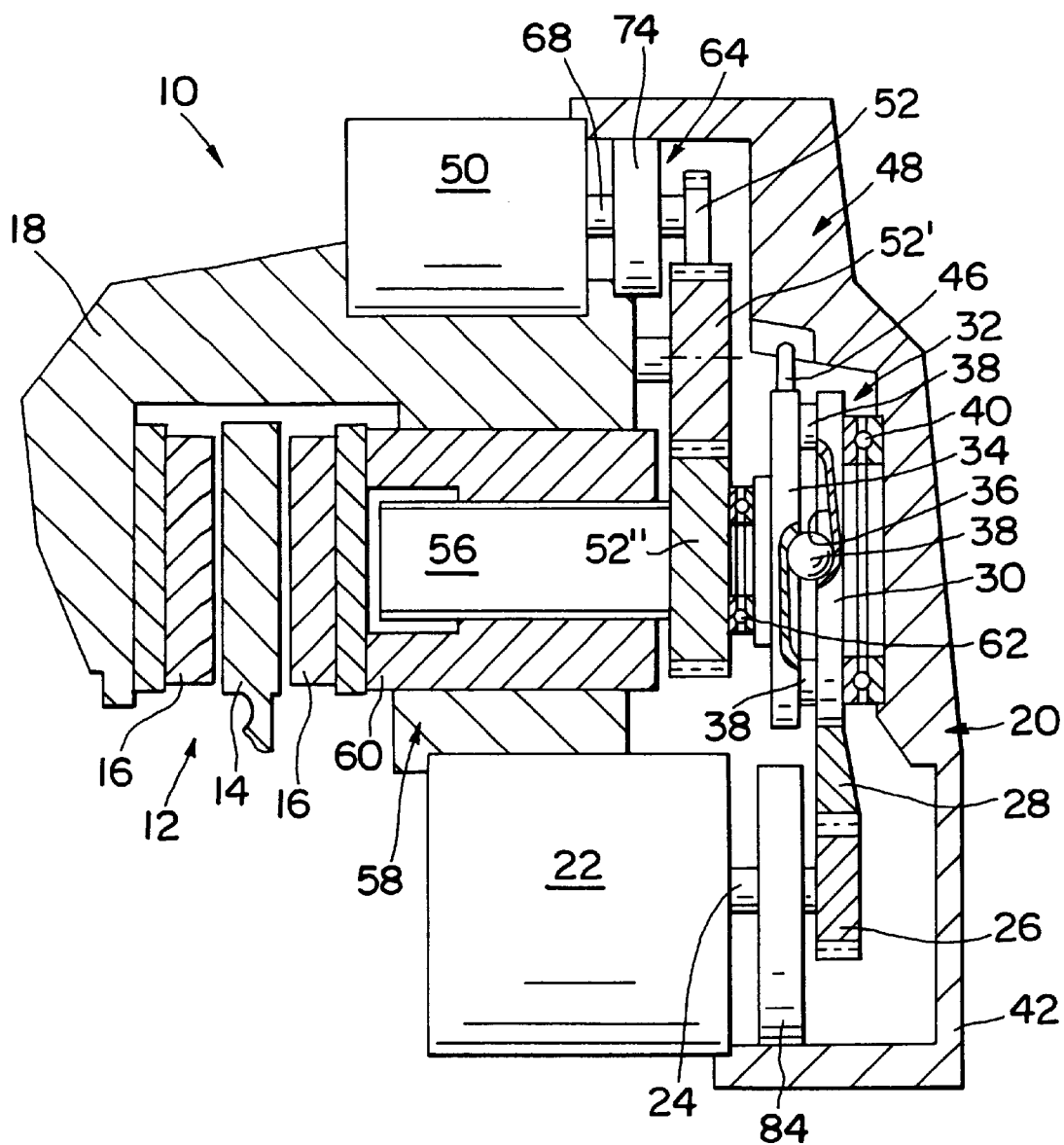
FIG. 1 is a section through a braking apparatus according to the invention, shown in simplified form.

The braking apparatus 10 of the invention, shown in the drawing, has a disk brake 12 with a brake disk 14 as its brake body, only a fragment of which in the peripheral region is shown in the drawing, and two brake shoes 16 with brake linings. The brake shoes 16 are received in a manner known per se in a floating caliper 18.

The braking apparatus 10 has an actuating device 20, which can be driven with an electric service motor 22: A pinion 26 is mounted in a manner fixed against relative rotation to a drive shaft 24 of the service motor 22. This pinion meshes with a gear segment 28, in other words a ring gear, which extends over only a limited angular range. The gear segment 28 is fixedly mounted to the circumference of a first ramp disk 30 of a roller body ramp mechanism 32. The roller body ramp mechanism 32 has two circular ramp disks 30, 34, disposed coaxially and parallel with some spacing from one another. The ramp disks, in facing face ends, have ramp tracks 36 in the form of grooves, which extend over a limited circumferential angle in the circumferential direction in the region of the circumference of the ramp disks 32, 34. The ramp tracks 36 have a pitch; that is, their depth changes steadily over the circumferential angle. Thus the ramp tracks 36 form short segments of helical paths. Balls 38 are received as roller bearings in the ramp tracks 36 and keep the ramp disks 30, 34 spaced apart from one another. By rotation of the two ramp disks 30, 34 contrary to one another, their spacing from one another can be varied. The structure of the roller body ramp mechanism 30 (in the exemplary embodiment shown, it is a ball ramp mechanism) is similar to an axial ball bearing, except that the ramp tracks for the roller bearings have a pitch and extend over only a limited circumferential angle. The roller bearings may also be conical, for example. A cross section of the ramp tracks is embodied as complementary to the roller bodies.

The second ramp disk 34 has a radially protruding snout 46, which is in engagement with the housing 42 and prevents the second ramp disk 34 from rotating along with the first ramp disk 30.

The ball ramp mechanism 32 has the advantage that because of the balls 38 rolling between its ramp disks 30, 34 it runs very easily, or in other words operates at high efficiency. Its first ramp disk 30 is braced, via an axial ball bearing 40, against a housing 42 mounted solidly to the floating caliper 18. By driving the first ramp disk 30 to rotate, by means of the service motor 22, the spacing between the two ramp disks 30, 34 increases; that is, the second ramp disk 34 is forced away from the first ramp disk 30, and the ball ramp mechanism 32 converts a rotating drive motion into a linear motion. The second ramp disk 34 presses the brake show 16, shown on the right in the drawing, against the brake disk 14, and via a reaction force the floating caliper 18, in a manner known per se, presses the other brake shoe 16 against the other side of the brake disk 14, so that a braking force is generated. To release the disk brake 12, the service motor 22 is operated in the opposite rotary direction.

To establish an air clearance, that is, a total gap between the brake shoes 16 and the brake disk 14, the braking apparatus 10 of the invention has a readjusting gear 48, which can be driven with an electric readjusting motor 50. The readjusting motor 50 is connected to a power supply that is independent of the power supply of the service motor 22. With it, via gear-wheel gears 52' and 52", a spindle 56 of a spindle drive 58 can be rotated. As a result, a spindle nut 60 is displaced axially on the spindle 56. The spindle 56 is braced against the second ramp disk 34 via an axial ball bearing 62, and the spindle nut 60 presses against the brake shoe 16 shown on the right of the brake disk 14 in the drawing. Accordingly, via the spindle drive 58, the ball ramp mechanism 32 presses the brake shoe 16 against the brake disk 14. The spacing between the second ramp disk 34 and the brake shoe 16, and thus the air clearance, can be established by adjusting the spindle drive 58.

Figure 2:
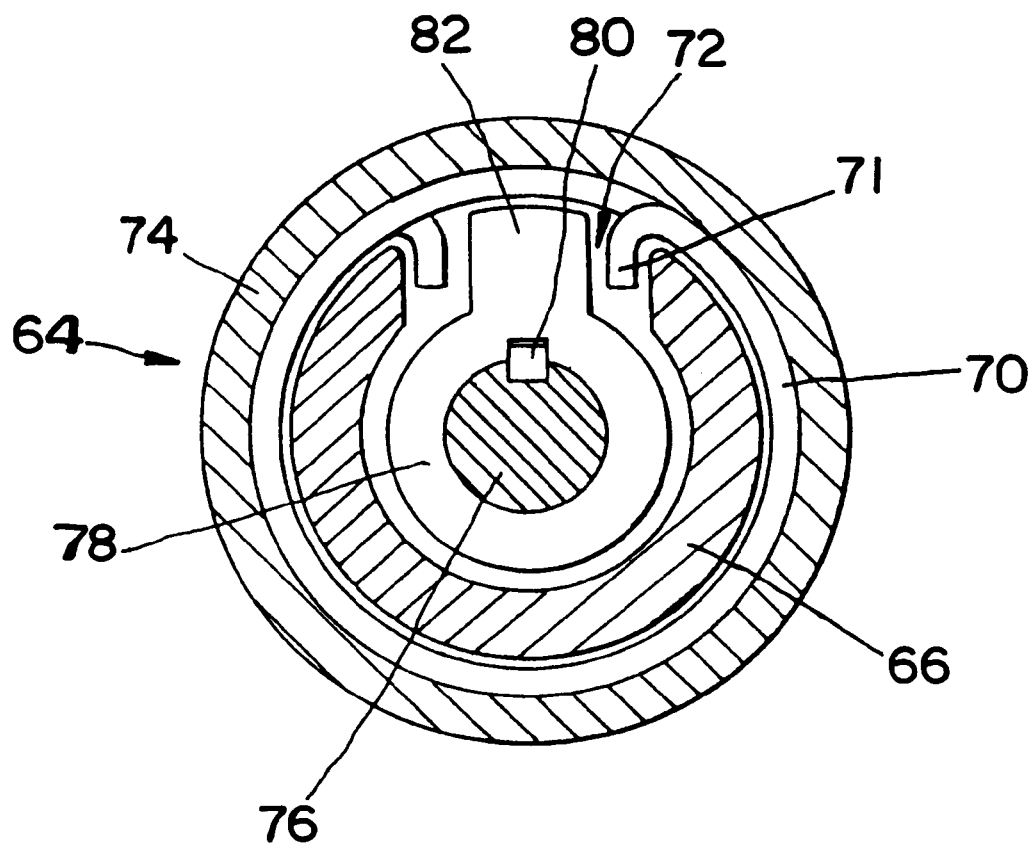
FIG. 2 is a section on a larger scale through a load moment block of the braking apparatus shown in FIG. 1.

Disposed between the readjusting motor 50 and the gear-wheel gear 52 is a load moment block 64, which transmits torques brought to bear by the readjusting motor 50 to the gear-wheel gear 52 in order to establish the air clearance, and which blocks the gear-wheel gear 52 against independent adjustment as a consequence of a torque operative at the gear-wheel gear 52. The load moment block 64, shown in cross section in FIG. 2, is embodied as a so-called wrapped belt load moment block. As its drive shaft 66, it has a slit hollow shaft, which is connected in a manner fixed against relative rotation to a motor shaft 68 of the readjusting motor 50. A wrapped belt spring 70 is wound around the drive shaft 66. The wrapped belt spring 70 is embodied as a helical spring with windings contacting one another and both of whose ends 71 are bent inward and protrude into a slit 72 of the slit drive shaft 66. The wrapped belt spring 70 rests in prestressed fashion against the inside of a hollow-cylindrical blocking ring 74, which concentrically surrounds the drive shaft 66 and is mounted in a manner fixed against relative rotation in the housing 42 or on the floating caliper 18 of the braking apparatus 10 of the invention.

An output shaft 76 is disposed coaxially inside the drive shaft 66 embodied as a hollow shaft. An annular blocking piece 78 is slipped onto the output shaft 76 and connected to the output shaft 76 in a manner fixed against relative rotation by means of a tongue and groove connection 80. The block piece 78 has a radially protruding snout 82, which between the inward-bent ends 71 of the wrapped belt spring 70 protrudes into the slit 72 of the drive shaft 66 embodied as a hollow shaft.

The function of the load moment block 64 is as follows: If the drive shaft 66 embodied as a hollow shaft is set into rotary motion with the readjusting motor 50, then— depending on the direction of rotation—it comes into contact with one of the two ends 71 of the wrapped belt spring 70 that protrude into its slit 72. As a result, the drive shaft 66 exerts a tensile force on the wrapped belt spring 70 in the circumferential direction thereof, thereby radially compressing the wrapped belt spring 70 and releasing it from the inside of the block ring 74. Via the end 71 of the wrapped belt spring 70, the drive shaft 66 presses against the snout 82 of the blocking piece 78 and in this way, in its rotary motion, carries the output shaft 76, which is connected in a manner fixed against relative rotation to the blocking piece 78, along with it. The rotary motion can occur in both directions of rotation.

If conversely a torque is applied to the output shaft 76, then the output shaft 76 rotates together with the blocking piece 78 attached to it in a manner fixed against relative rotation, until its snout 82 strikes one of the ends 71 of the wrapped belt spring 70. As a result, a compressive force is exerted in the circumferential direction on the wrapped belt spring 70; the consequence is a radially outward-oriented force of the windings of the wrapped belt spring 70 and hence an even stronger contact of the wrapped belt spring 70 with the blocking ring 74; that is, the load moment block 64 is blocked and prevents a rotation originating in the gear-wheel gear 52.

Since the readjusting gear 48 is blocked against independent adjustment by its load moment block 64, its spindle drive 58 is embodied as free of self-inhibition, by embodying the spindle 56 with a sufficiently pronounced thread pitch.

To establish the air clearance and to readjust the air clearance upon brake lining wear, the two brake shoes 16, with the actuating device 20 restored, are put into contact with the brake disk 14 with the readjusting gear 48. This can be ascertained for instance from the sharply increasing power consumption of the readjusting motor 50, as soon as the brake shoes 16 come to rest on the brake disk 14, and further adjustment requires an abrupt increase in force. Once the brake shoes 16 contact the brake disk 14, they are moved backward with the readjusting gear 48 by a certain distance, namely the distance amounting to the air clearance. This can be done by operating the readjusting motor 50 in the reverse direction for a fixed period of time.

In the fault mode, that is, if the service motor 22 or its power supply fails, or if the actuating device 20 is blocked, for instance because of a mechanical defect, then the braking apparatus 10 of the invention can be released by turning its readjusting motor 50 "on" in the releasing direction. The readjusting motor 50 then need merely bring to bear the slight unblocking moment of the load moment block 64 and optionally the internal friction of the readjusting gear 50, since the brake shoes 16 move the self-inhibition-free spindle drive 58 in the releasing direction when they are pressed against the brake disk 14 with a contact-pressure force.

If the air clearance between the brake shoes 16 and the brake disk 14 is to be overcome rapidly for braking purposes, then the readjusting motor 50 is turned "on"; via the load moment block 46, the gear-wheel 52 gears 52' and 52" and the spindle drive 58, it puts the brake shoes 16 into contact with the brake disk 14. Since the spindle drive 58 has a pronounced thread pitch, the air clearance can be rapidly overcome with the readjusting motor 50. If the brake shoes 16 are in contact with the brake disk 14 then the readjusting motor 50 is turned "off"; a braking moment is brought to bear in the manner described above with the service motor 22, which can be turned "on" together with the readjusting motor 50, or may not be turned "on" until the brake shoes 16 rest on the brake disk 14.

The braking apparatus of the invention may have a second load moment block 84 for its actuating device 20, and this second load moment block is embodied identically to the load moment block 64 of the readjusting gear 48. This load moment block 84 is disposed between the service motor 22 and its pinion 26; it transmits torques of the service motor 22 to the pinion 26, but blocks counter to a rotation on the basis of a moment operative at the pinion 26. The provision of a second load moment block 84 for the actuating device 20 has the advantage first that the braking apparatus 10 according to the invention can be used as a parking brake, since it maintains an imposed contact-pressure force of its brake shoes 16 against the brake disk 14 and thus an imposed braking moment even after the shutoff of the service motor 22, because of the blocking action of the second load moment block 84. Another advantage of the second load moment block 84 is that the service motor 22, when there is a braking moment kept constant during a braking event, can be turned "off" since the second load moment block 84 maintains the braking moment. The service motor 22 need be actuated merely in order to bring to bear and change the braking moment, that is, the contact-pressure force of the brake shoes 16 against the brake disk 14.

The foregoing relates to a preferred exemplary embodiment of the invention, it being understood that other variants and embodiments thereof are possible within the spirit and scope of the invention, the latter being defined by the appended claims.

We claim:

1. A braking apparatus for a vehicle, comprising an actuating device that is drivable by an electric service motor and with which a brake lining can be pressed against a brake body, the braking apparatus (10) has a readjusting gear (48), which is drivable by an electric readjusting motor (50) and with which an air clearance between the brake lining (16) and the brake body (14) can be adjusted, and that the readjusting gear (48) has a load moment block (64), which transmits a readjusting moment, applied by the readjusting motor (50), and blocks the readjusting gear (48) against adjusting itself independently, and said readjusting motor has a power supply which is separate from the power supply of said service motor.

2. A braking apparatus for a vehicle, comprising an actuating device that is drivable by an electric service motor and with which a brake lining can be pressed against a brake body, the braking apparatus (10) has a readjusting gear (48) including a spindle (56), which is drivable by an electric readjusting motor (50) and with which an air clearance between the brake lining (16) and the brake body (14) can be adjusted, and that the readjusting gear (48) has a load moment block (64), which transmits a readjusting moment, applied by the readjusting motor (50), and blocks the readjusting gear (48) against adjusting itself independently, and the readjusting motor (50) is activated by a separate power supply from that of the electric service motor to drive gears (52, 52' and 52") which drive the spindle (56) in order to overcome the air play of the brakes.

3. A braking apparatus for a vehicle, comprising an actuating device that is drivable by an electric service motor and with which a brake lining can be pressed against a brake body, the braking apparatus (10) has a readjusting gear (48), which is drivable by an electric readjusting motor (50) and with which an air clearance between the brake lining (16) and the brake body (14) can be adjusted, and that the readjusting gear (48) has a load moment block (64), which transmits a readjusting moment, applied by the readjusting motor (50), and blocks the readjusting gear (48) against adjusting itself independently, and said readjusting motor (50) is actuated to release the actuated braking apparatus (10) in the event of a failure of the service motor (22) as well as for a defect in the actuating device (20).

\* \* \* \* \*